(12) United States Patent
Nuang

(10) Patent No.: US 7,261,086 B2
(45) Date of Patent: Aug. 28, 2007

(54) FAST WARM-UP OF DIESEL AFTERTREATMENT SYSTEM DURING COLD START

(75) Inventor: Yiqun Nuang, San Antonio, TX (US)

(73) Assignee: Southwest Research Institute, San Antonio, TX (US)

(*) Notice: Subject to any disclaimer, the term of this patent is extended or adjusted under 35 U.S.C. 154(b) by 0 days.

(21) Appl. No.: 11/582,284

(22) Filed: Oct. 17, 2006

(65) Prior Publication Data

US 2007/0089400 A1 Apr. 26, 2007

Related U.S. Application Data

(60) Provisional application No. 60/729,079, filed on Oct. 21, 2005.

(51) Int. Cl.
*F02M 7/12* (2006.01)
*F02M 7/00* (2006.01)

(52) U.S. Cl. .......................... 123/436; 60/290; 60/300

(58) Field of Classification Search ............ 123/436, 123/435, 299, 300; 60/284, 285, 274, 278, 60/286, 290, 300, 302
See application file for complete search history.

(56) References Cited

U.S. PATENT DOCUMENTS

| 4,380,988 | A | 4/1983 | Otsuka et al. |
|---|---|---|---|
| 5,740,775 | A | 4/1998 | Suzuki et al. |
| 6,276,334 | B1 | 8/2001 | Flynn et al. |
| 6,651,677 | B2 | 11/2003 | Sukegawa et al. |
| 6,725,829 | B2 | 4/2004 | Kataoka et al. |
| 6,804,952 | B2 * | 10/2004 | Sasaki et al. .............. 60/284 |
| 6,807,958 | B2 | 10/2004 | Kabat et al. |
| 6,834,496 | B2 | 12/2004 | Nakatani et al. |
| 6,935,100 | B2 | 8/2005 | Miura |
| 6,990,949 | B2 | 1/2006 | Kataoka et al. |
| 2004/0128985 | A1 | 7/2004 | Shimasaki et al. |
| 2005/0193977 | A1 | 9/2005 | Hata et al. |

FOREIGN PATENT DOCUMENTS

JP 11229973 A * 8/1999

* cited by examiner

*Primary Examiner*—Mahmoud Gimie
(74) *Attorney, Agent, or Firm*—Gunn & Lee PC

(57) ABSTRACT

Intake air is severely restricted during cold start of a diesel engine to provide high engine-out exhaust gas temperatures and quickly heat exhaust treatment devices. Cylinder pressures are maintained substantially below the pressure of the ambient atmosphere during a principal portion of the intake stroke of each combustion cycle to promote rapid fuel vaporization and higher combustion temperatures. The engine is operated in a premixed charge compression ignition combustion mode to provide a high engine-out exhaust temperature, stable combustion, and low emissions during the cold start period.

6 Claims, 4 Drawing Sheets

FAST WARM-UP OF DIESEL AFTERTREATMENT SYSTEM DURING COLD START

Applicant claims priority under 35 U.S.C. §119 of U.S. Provisional Application Ser. No. 60/729,079, filed Oct. 21, 2005.

BACKGROUND OF THE INVENTION

1. Technical Field

This invention relates generally to a method for increasing engine-out temperature during cold start of a diesel engine to provide fast warm-up of exhaust aftertreatment system components, and more particularly to such a method that includes reducing the mass of the intake air charge and the intake manifold pressure of low-pressure premixed charge compression ignition dominated combustion during cold start.

2. Background Art

The U.S. Environmental Protection Agency (EPA) has set very stringent emissions standards for diesel engines. The standards are directed at reducing smog-causing emissions from all diesel engines, including off-road vehicles, trucks, buses, recreational vehicles, and motor homes. In particular, standards set forth for model year 2007 place significant limits on $NO_x$ and particulate matter (PM) emissions that will require changes in both in-cylinder (engine-out) combustion control and exhaust treatment devices.

Several alternative combustion modes, such as low temperature combustion (LTC), premixed charge compression ignition (PCCI), and other variations of standard diesel combustion, are currently being studied for in-cylinder combustion control. Simultaneously, exhaust treatment devices are being developed to synergistically couple with specific combustion modes. Currently, a lean $NO_x$ trap (LNT) is the most likely exhaust treatment device for the control of NOx emissions for light-duty diesel vehicles, while diesel particulate filters (DPF) are a near certainty for PM control.

Although these devices currently offer the most promise for controlling exhaust emissions, they are not effective until they are heated to a predefined operating, or activation, temperature. Fast warm-up during cold start is an important issue because if the exhaust treatment devices are not active early in the first phase of the prescribed Federal Test Procedure 75 (FTP-75) driving cycle, the vehicle will exceed the emissions limits.

Several techniques have been proposed for specifically decreasing the warm-up time of exhaust treatment devices. For example, recently published U.S. Pat. No. 6,935,100 B2 granted Aug. 30, 2005 to Manabu Miura for a METHOD FOR WARM-UP CATALYST OF EXHAUST GAS TREATMENT DEVICE describes reducing the excess air ratio of the intake charge during cold start and warm-up. However, the method proposed by Miura requires one or more delay periods after cold start to make certain determinations and adjustments. Moreover, it has been found that controlling excess air, by itself, has limited effect on providing the high in-cylinder (engine-out) temperatures required to quickly heat exhaust treatment devices to their effective operating temperature.

The present invention is directed to overcoming the problems described above with respect to reducing the warm-up time of exhaust treatment devices during cold start and warm-up. It is desirable to have a method for reducing the exhaust flow rate during cold start and warm-up of an engine by immediately reducing the mass of the intake air charge by reducing intake charge pressure during the intake stroke of each combustion cycle and increasing engine fueling. It is also desirable to have a method whereby NOx emissions are reduced during cold start. Moreover, it is desirable to have a method for limiting soot emissions during cold start and warm-up of an engine by using premixed charge compression ignition combustion in which the intake and compression stroke pressures are reduced to enhance fuel vaporization and fuel-air mixing.

SUMMARY OF THE INVENTION

In accordance with one aspect of the present invention, a method for the fast warm-up of an exhaust treatment device during cold start of a diesel engine includes determining a desired activation temperature for the exhaust treatment device. The intake throttle of the engine is closed to restrict airflow into the intake manifold so that the intake charge has a pressure that is significantly less than the pressure of the ambient environment in which the engine is operating. The engine is started and operated at fast idle in a premixed charge compression ignition combustion mode during the cold start period of operation.

Other features of the method for the fast warm-up of an exhaust gas treatment device during cold start of a diesel engine, in accordance with the present invention, includes increasing the idle speed of the engine to a value sufficient to provide an engine-out exhaust gas temperature that is higher than the determined activation temperature of the exhaust treatment device. Also, during cold start, the turbine section of a variable geometry turbocharger associated with the engine is closed to a minimal flow position.

Another feature of the method for the fast warm-up of an exhaust gas treatment device during cold start of a diesel engine, in accordance with the present invention, includes advancing fuel injection timing when operating at idle in the low pressure premixed charge compression ignition combustion mode.

Yet another feature of the method for the fast warm-up of an exhaust gas treatment device during cold start of a diesel engine, in accordance with the present invention, includes the engine having a low pressure loop exhaust gas recirculation system with an exhaust gas recirculation cooler incorporated in the system, and the method includes bypassing any exhaust gas directed through the low pressure loop exhaust gas recirculation system around the exhaust gas recirculation cooler during fast warm-up of the catalyst.

Still another feature of the method for the fast warm-up of an exhaust gas treatment device during cold start of a diesel engine, in accordance with the present invention, includes the engine having a variable valve actuation system for controllably opening and closing the intake and exhaust valves in the engine, and the method includes restricting the opening of the intake valves during an intake stroke of the combustion cycle to a position sufficient to provide a cylinder pressure prior to the compression stroke of less than about 55 $kPa_{abs}$.

BRIEF DESCRIPTION OF THE DRAWINGS

A more complete understanding of the test fixture for collecting particulate material carried in the exhaust gas of an engine may be had by reference to the following detailed description when taken in conjunction with the accompanying drawings, wherein.

DETAILED DESCRIPTION OF THE INVENTION

Figure 1:
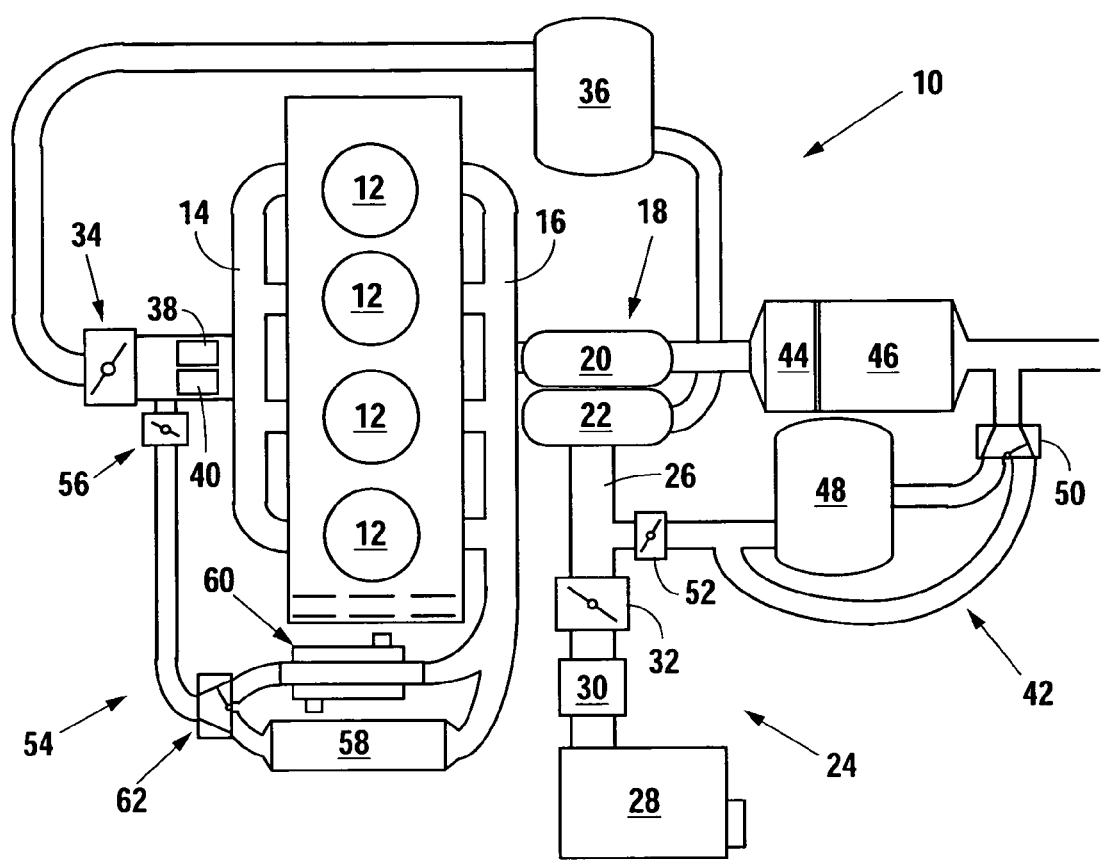
FIG. 1 is a schematic diagram of an engine system adapted to carry-out the method for the fast warm-up of an exhaust treatment device during cold start of a diesel engine in accordance with the present invention.

A conventional engine system suitable for illustrating the method for the fast warm-up of a diesel exhaust treatment device during cold start of a diesel engine, in accordance with the present invention, is generally identified by the reference number 10 in FIG. 1. The engine 10 has a plurality of cylinders, or compression chambers, 12, each of which are in controlled fluid communication by respective intake and exhaust valves, not shown, with an intake manifold 14 and an exhaust manifold 16. The engine 10 also has a conventional variable geometry turbocharger (VGT) 18. A turbine section 20 of the VGT 18 is in direct fluid communication with the exhaust manifold 16 and has a variable throat area which can be closed to a minimal flow position at which exhaust flow through the turbine section is severely limited. Alternatively, a waste gate, not shown, can provide a minimal flow of exhaust gas around the turbine section 20 if the turbine section is capable of being completely closed. In the ensuing discussion of the method embodying the present invention for the fast warm-up of a diesel exhaust treatment device during cold start of a diesel engine, the terms "variable geometry fully closed" or VGT fully closed" assume that there is a positive, though minimal, net flow of exhaust gas from the combustion chambers 12 following combustion of an intake charge and fuel. A compressor section 22 of the VGT is fluid communication with the intake manifold 14 of the engine 10.

The engine 10 also has an intake air, or combustion charge, system that is generally indicated by the reference number 24. The intake air system 24 includes an intake air duct 26 in fluid communication with ambient air inducted through an air filter 28, an intake air mass airflow (MAF) sensor 30 and an optional low pressure intake throttle valve 32 positioned between the air filter and the intake port of the compressor section 22 of the VGT 18. The intake air system further includes a high pressure intake air throttle valve 34 positioned in close proximity to the intake manifold 14 and an intercooler 36 adapted to cool a compressed intake air charge. The intercooler is interposed between a discharge port of the compressor section 22 and the high pressure intake air throttle valve 34. An intake manifold air pressure (MAP) sensor 38 and an intake manifold air temperature (MAT) sensor 40 are positioned adjacent, or in, the intake manifold 14.

In the illustrated representative engine system, the engine has exhaust treatment devices such as an oxidation catalyst 44 and a continuously regenerable diesel particulate filter and lean $NO_x$ trap (cDPF/LNT) 46 positioned between a discharge port of the turbine stage 20 of the VGT 18 and the ambient environment. The aftertreatment devices 44, 46 are catalytic-based converters or traps that reduce harmful emissions in the exhaust discharged from the engine 10 and require that the catalytic-surfaces, or beds, within the devices be heated to a temperature above a predefined activation temperature in order to function for their intended purposes. Importantly, the present invention is directed to heating the exhaust treatment devices 44, 46 to their respective predefined activation temperatures as quickly as possible after a cold start of the engine to limit the amount of untreated exhaust discharged at cold start and during a warm-up period following the cold start.

The engine 10 has low pressure loop exhaust gas recirculation (EGR) system that is generally indicated by the reference numeral 42. The low pressure EGR system 42 is arranged to recirculate selected amounts of exhaust gas from the exhaust system downstream of the exhaust treatment devices 44, 46 back to the intake manifold 14. The low pressure EGR system 42 has an exhaust gas recirculation cooler 48 adapted to cool the recirculated exhaust gas, when desired, and a bypass valve 50 arranged to bypass recirculated exhaust around the EGR cooler when cooling, for example during start-up from a cold start, is not desired. A low pressure loop exhaust gas recirculation control valve 52 is positioned in close proximity to the intake port of the compressor section 22 of the VGT 18 to control the flow of recirculated exhaust gas through the low pressure loop EGR system 42.

The engine 10 also has a high pressure loop exhaust gas recirculation (EGR) system that is generally indicated in FIG. 1 by the reference numeral 54. The high pressure loop EGR system 54 is in direct communication with the exhaust manifold 16 of the engine 10 and exhaust gas directed through the high pressure loop EGR system back into the intake manifold 14 does not pass through the turbine section 20 of the VGT 18. Flow through the high pressure loop EGR system 54 is controlled by a high pressure loop exhaust gas recirculation (EGR) flow control valve 56. A high pressure loop exhaust gas recirculation catalyst 58 and a high pressure loop exhaust gas recirculation cooler 60 are positioned in the high pressure loop EGR system 54 at a position between the exhaust manifold 16 of the engine 10 and the high pressure loop EGR flow control valve 56. Flow through a selected one, or both, of the high pressure loop exhaust gas recirculation catalyst 58 and the high pressure loop exhaust gas recirculation cooler 60 is controlled by a bypass control valve 62 positioned between the respective devices and the high pressure loop EGR flow control valve 56.

Turning now to the method for the fast warm-up of an exhaust treatment device during cold start of a diesel engine in accordance with the present invention, many fast warm up techniques such as increasing idle speed, slightly throttling the intake air, and exhaust throttling to increase engine load have been proposed. Typically, engine speed is increased for fast warm up of an exhaust treatment catalyst and to improve combustion stability at cold engine conditions. For example, with low engine coolant temperature, such as at −25° C., engine idle speed is controlled at 1100 rpm for stable combustion as well as fast warm-up. At warmed-up engine conditions, such as engine coolant temperature at 15° C. and above, low idle speed (850 rpm) is used. Other approaches include using in-cylinder controls, e.g., airflow control, idle speed, and injection retardation strategies.

Before reaching the activation temperature of a diesel exhaust catalyst (DOC), the only natural heating source for warm up of the catalyst is through the exhaust gas. Increasing engine load (including increasing idle speed) is an effective way to increase the exhaust gas temperature. But too high of a load or speed at idle will present a safety hazard.

Figure 2:
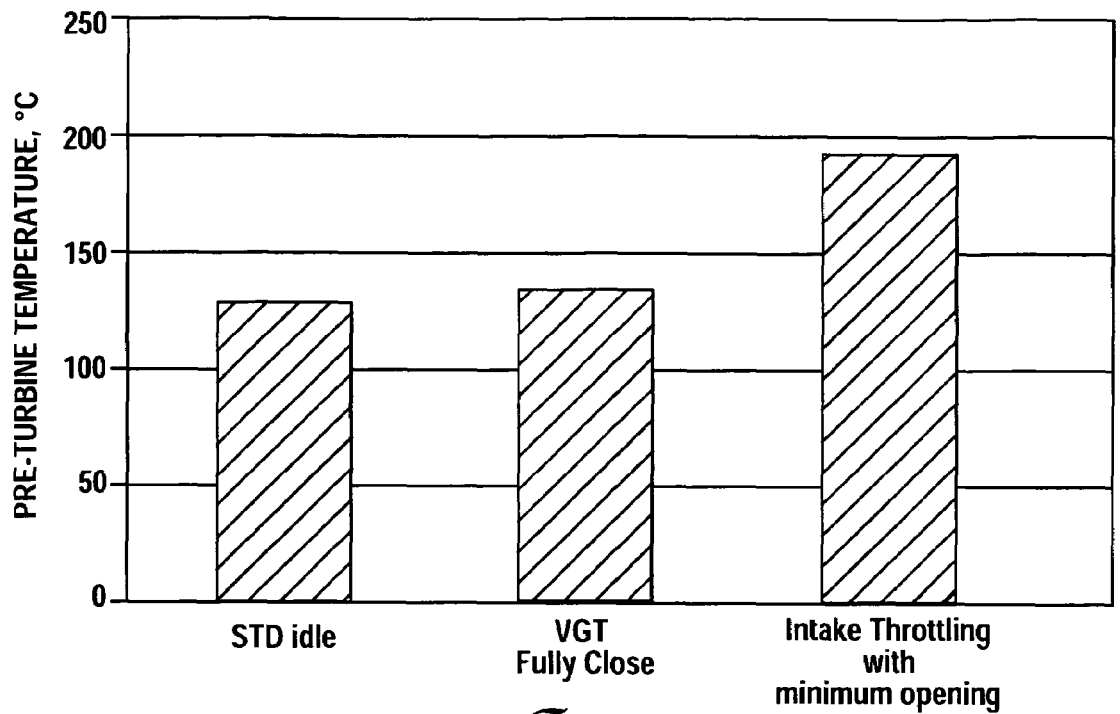
FIG. 2 is an bar graph comparing pre-turbine temperature at standard idle, with a variable geometry turbocharger closed to a minimal flow position, and with the intake throttle closed to a position whereat the flow of intake air into the intake manifold is markedly reduced in accordance with the present invention.

One way to increase the engine load but not increase the engine speed is to use an exhaust restriction, either internally by a variable valve actuation system or externally by an exhaust restriction valve. However, in marked contrast in carrying out the present invention, engine load is increased by intake throttling. As illustrated in FIG. 2, at 850 rpm idle, the effect of closing a variable geometry turbocharger (VGT) on exhaust throttling is negligible due to the low exhaust flow and, accordingly, the pre-turbine temperature is about the same as with the VGT fully open. With severe intake throttling to provide an extremely low manifold air pressure of 52 kPa and the VGT closed to a minimal flow position, the pre-turbine temperature increases dramatically from 136° C. to 195° C., almost a 60° C. increase. This increase is helpful, but higher exhaust temperatures are needed to quickly heat the catalytic-based exhaust treatment devices to the activation temperature.

Figure 3:
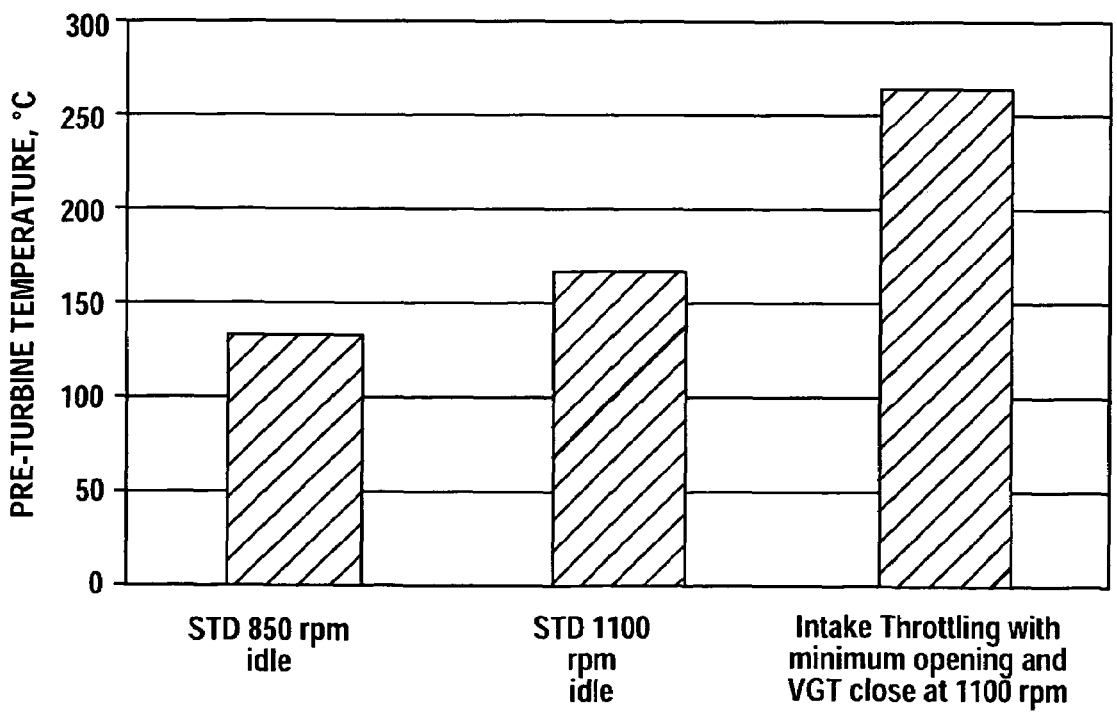
FIG. 3 is an bar graph comparing pre-turbine temperature at standard idle, at fast idle, and with the intake throttle closed to a position whereat the flow of intake air into the intake manifold is markedly reduced and the variable geometry turbocharger closed to a minimal flow position in accordance with the present invention.

Increasing idle speed to a reasonable level, for example fast idle at 1100 rpm, can be combined with significant intake air throttling to increase engine-out (turbine-in) exhaust temperature. As illustrated in FIG. 3, the combined effect of severe intake throttling to provide an even lower intake manifold pressure of 40 kPa and increased idle speed (1100 rpm), increases the pre-turbine temperature from 131° C. standard idle at 850 rpm to 260° C., a temperature well above the activation temperature of closed coupled oxidation catalyst, at 1100 rpm.

Figure 4:
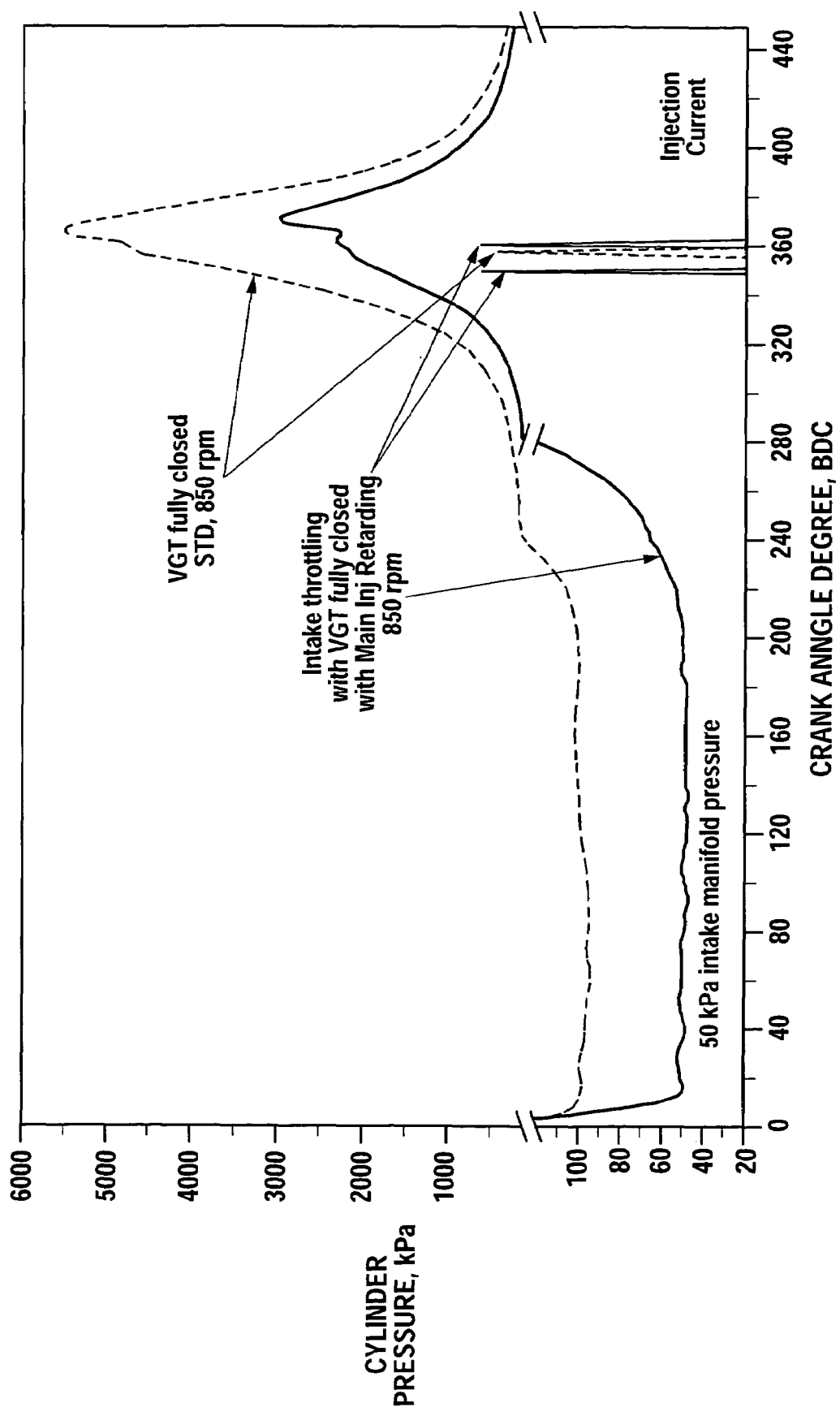
FIG. 4 is a graph of cylinder pressure as a function of crank angle, illustrating the greatly reduced cylinder pressure provided at idle as a result of throttling the intake air, closing the variable geometry turbocharger to a minimal flow position, and providing both pilot and subsequent fuel injections in accordance with the present invention; and, FIG. 5 is a graph of cylinder pressure as a function of crank angle, illustrating the greatly reduced cylinder pressure provided at fast idle as a result of throttling the intake air, closing the variable geometry turbocharger to a minimal flow position, and advancing fuel injection in accordance with the present invention.

In accordance with the present invention, in addition to intake throttling and increasing idle speed to fast idle, the timing of the first fuel injection is advanced to provide a pre-mixed combustion mixture. Importantly, the extremely lower cylinder pressure resulting from severely restricting the intake air flow significantly increases fuel vaporization and promotes stable combustion. In FIG. 4, the cylinder pressure trace, at 850 rpm idle, resulting from only closing the VGT 18 is shown in dashed lines. As a result of closing the VGT, the maximum cylinder pressure, at combustion, is about 5,500 $kPa_{abs}$. The solid pressure trace shows the dramatically lower maximum cylinder pressure at 850 rpm idle obtained, in accordance with the present invention, by additionally throttling the intake air charge to provide a cylinder pressure of about 50 $kPa_{abs}$ over the principal portion of the intake stoke of each combustion cycle and advancing pilot fuel injection timing to provide a premixed charge prior to combustion. Pilot fuel injection timing is advanced to provide a premixed charge compression ignition (PCCI) combustion mode. The dramatically restricted intake air charge results in the cylinder pressure during most of the intake stroke of the compression cycle being significantly below the pressure of the ambient atmosphere, thereby aiding vaporization of the injected fuel. When operating in the low pressure PCCI combustion mode, both soot, i.e., particulate matter (PM), and $NO_x$ emissions are reduced during warm-up from a cold start.

Figure 5:
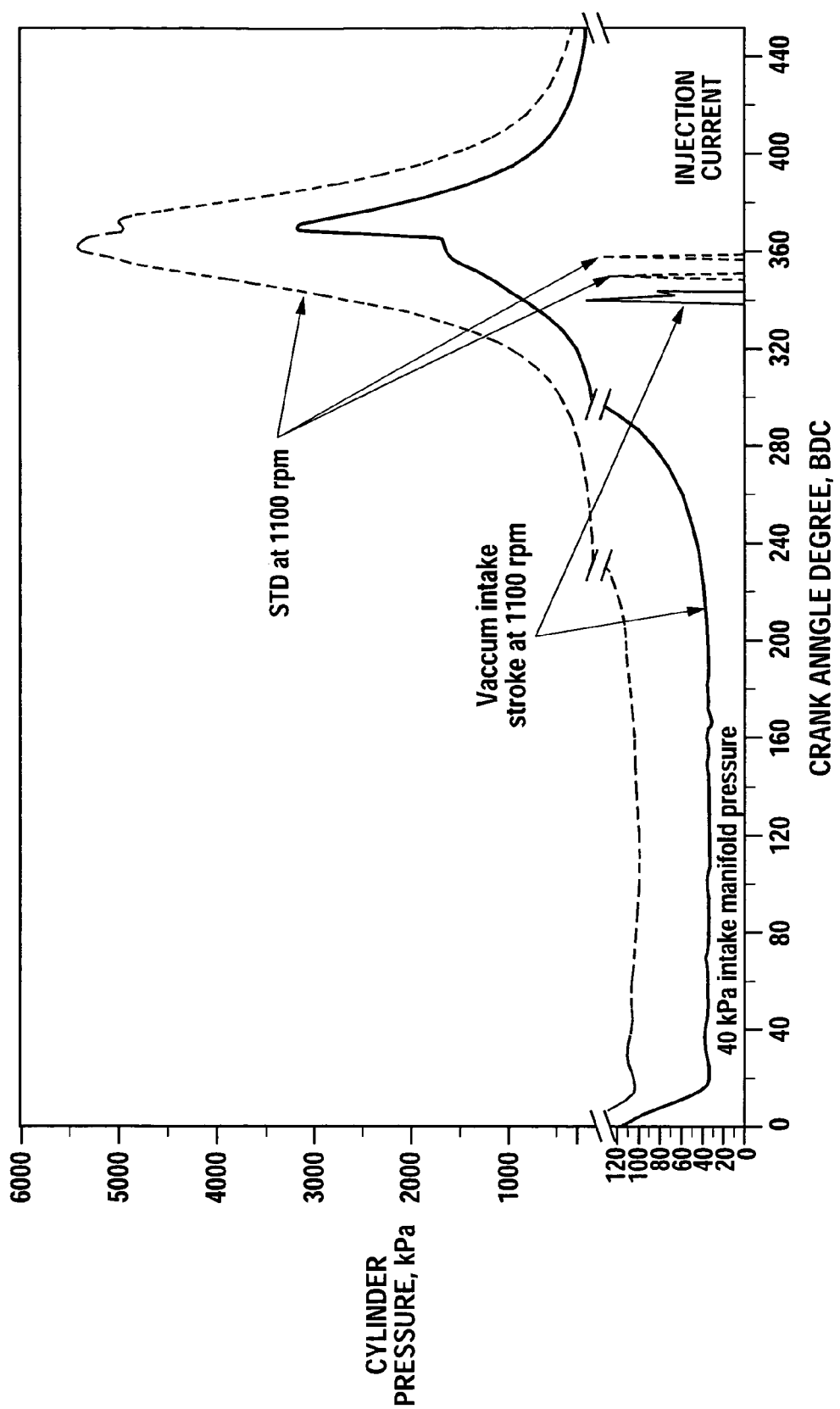

In a preferred embodiment of the present invention, the effect of increasing idle speed from a standard 850 rpm idle to 1100 rpm fast idle, and injecting the total fuel charge in a single injection at least 20° BTDC to provide a premixed mixture prior to combustion, is illustrated in FIG. 5. Importantly, cylinder pressure over the principal portion of the intake stoke of each combustion cycle is reduced to about 40 kPaabs further aiding fuel vaporization and improving combustion.

Before the DPF 46 reaches it activation temperature, the DPF-out exhaust gas temperature will be low. Accordingly, prior to the DPF 46 reaching its activation temperature, any exhaust gas recirculated through the low pressure loop EGR system 42 is bypassed around the EGR cooler 48 by operation of the bypass valve 50. Thus, the recirculated exhaust gas is redirected to the intake port of the compressor section 22 of the VGT 18 without passing through the low pressure EGR cooler 48 and thereby increases the net intake charge temperature by mixing the bypassed recirculated exhaust gas with intake air, an important result of circulating the high temperature exhaust through the catalyst. Bypassing of the low pressure EGR cooler 48 is continued until the DPF temperature is close to, or above, its activation temperature.

After high exhaust and preturbine temperatures are obtained, the VGT 18 is opened to pass the high temperature exhaust gas to the downstream exhaust treatment devices 44, 46 so that fast warm up of the exhaust treatment devices can be continued. Low pressure loop EGR may also be used to increase the temperature of the exhaust gas circulated to the exhaust treatment devices 44, 46 as a result of reducing the amount of excess air that would have to be heated by combustion.

From the above description, it can be seen that exhaust temperature during cold start of a diesel engine can be increased by reducing intake charge pressure during the intake stroke. Preferably, the intake charge flow is restricted to provide an intake manifold, or cylinder, pressure on the order of no more than 55 kPa absolute compared with standard diesel combustion at idle which is typically about 100 kPa absolute, i.e., at or near the pressure of the ambient atmosphere. In carrying out the present invention, low pressure premixed combustion is dominant and exhaust NOx emissions are very low. The formation of a premixed air/fuel mixture is assisted by the extremely low compression pressure, relatively high cylinder temperature, and high temperature residual gas.

Also, in accordance with the present invention, maintaining stable combustion under extremely low intake charge pressure is accomplished by advancing the first injection event to generate a premixed charge dominated air fuel mixture. The exhaust emissions flowrate is also reduced as a result of drastically reducing the intake charge mass.

The present invention further produces very low soot emissions as a result of using low pressure premixed charge combustion and simultaneously significantly reducing the intake and compression stroke pressure to enhance fuel vaporization and fuel air mixing.

In carrying out the present invention, extremely low intake charge pressure is accomplished by closing an intake throttle valve positioned between an ambient air source and the intake manifold of the engine either before or after the compressor section of the turbocharger In an engine having a variable valve actuation system, intake charge pressure can be lowered by restricting the opening of the intake valves The present invention also provides for fast light-off of the exhaust system components by circulating more high temperature exhaust through the components using the low pressure loop EGR system 42 after high engine-out temperatures are obtained. Also, a desired A/F ratio can be maintained by either low pressure loop EGR or high pressure loop EGR in addition to intake throttle control.

Although the present invention is described in terms of an illustrative preferred embodiment with reference to a specific engine configuration, those skilled in the art will recognize that the implementation of the method for the fast warm-up exhaust treatment devices during cold start of a diesel engine can be modified. For example, the method embodying the present invention can be carried out on a diesel engine having only a single, or even no, exhaust gas recirculation system. Also the engine may be equipped with a conventional turbocharger with a waste gate and downstream exhaust flow restriction throttle instead of a variable geometry turbocharger. Such applications of the method embodying the present invention are intended to fall within the scope of the following claims.

Other aspects, features, and advantages of the present invention may be obtained from a study of this disclosure and the drawings, along with the appended claims.

What I claim is:

1. A method for the fast warm-up of an exhaust treatment device during cold start of a diesel engine having a plurality of combustion chambers, a means for restricting the flow of an intake air charge into the combustion chambers, a fuel injection system, and a variable geometry turbocharger, said method comprising:

determining a desired activation temperature for said exhaust treatment device;

closing said means for restricting the flow of an intake air charge to a position sufficient to provide a combustion chamber pressure of less than 55 $kPa_{abs}$ throughout a principal portion of the intake stoke of each combustion cycle of the engine;

starting said engine; and operating said engine at fast idle in a low pressure premixed charge compression ignition combustion mode and increasing the idle speed to a value sufficient to provide an engine-out exhaust gas temperature higher than said determined desired activation temperature of said exhaust treatment device.

2. The method for the fast warm-up of an exhaust treatment device during cold start of a diesel engine, as set forth in claim 1, wherein said method includes closing the turbine section of said variable geometry turbocharger to a minimal-flow position.

3. The method for the fast warm-up of an exhaust treatment device during cold start of a diesel engine, as set forth in claim 1, wherein said method includes advancing the timing of fuel injected during each combustion cycle to provide stable combustion while operating at fast idle in said low pressure premixed charge compression ignition combustion mode.

4. The method for the fast warm-up of an exhaust treatment device during cold start of a diesel engine, as set forth in claim 1, wherein said engine has a low pressure loop exhaust gas recirculation system with a exhaust gas recirculation cooler disposed therein, and said method includes selectively bypassing any exhaust gas directed through the low pressure loop exhaust gas recirculation system around said exhaust gas recirculation cooler during fast warm up of the exhaust treatment device.

5. The method for the fast warm-up of an exhaust treatment device during cold start of a diesel engine, as set forth in claim 1, wherein said means for restricting the flow of an intake air charge into the combustion chambers of the engine is an intake throttle, and said closing said means for restricting the flow of an intake air charge to a position sufficient to provide a combustion chamber pressure of less than 55 $kPa_{abs}$ throughout a principal portion of the intake stoke of each combustion cycle of the engine includes closing said intake throttle to a position sufficient to provide an intake manifold pressure of less than 55 $kPa_{abs}$.

6. The method for the fast warm-up of an exhaust treatment device during cold start of a diesel engine, as set forth in claim 1, wherein said engine has a variable valve actuation system for controllably opening and closing the intake and exhaust valves in said engine, and said closing said means for restricting the flow of an intake air charge to a position sufficient to provide a combustion chamber pressure of less than 55 $kPa_{abs}$ throughout a principal portion of the intake stoke of each combustion cycle of the engine includes restricting the opening of the intake valves during the intake stroke of each combustion cycle.

* * * * *

UNITED STATES PATENT AND TRADEMARK OFFICE
CERTIFICATE OF CORRECTION

| | |
|---|---|
| PATENT NO. | : 7,261,086 B2 |
| APPLICATION NO. | : 11/582284 |
| DATED | : August 28, 2007 |
| INVENTOR(S) | : Yiqun Huang |

Page 1 of 1

It is certified that error appears in the above-identified patent and that said Letters Patent is hereby corrected as shown below:

On the Title page, at (12), delete "Nuang" and insert --Huang-- therein.

On the Title page, delete line at (75) and insert the following therein:

--(75)  Inventor:  Yiqun Huang, San Antonio, TX (US)--

Signed and Sealed this

Fourth Day of December, 2007

JON W. DUDAS
*Director of the United States Patent and Trademark Office*